United States Patent [19]
Drzewiecki

[11] 3,971,257
[45] July 27, 1976

[54] LAMINAR JET LINEAR ACCELEROMETER

[75] Inventor: Tadeusz M. Drzewiecki, Silver Spring, Md.

[73] Assignee: The United States of America as represented by the Secretary of the Army, Washington, D.C.

[22] Filed: Aug. 14, 1975

[21] Appl. No.: 604,736

[52] U.S. Cl. .............................. 73/515; 137/804; 137/840
[51] Int. Cl.² ...................................... G01P 15/02
[58] Field of Search ................ 73/515, 516 LM; 137/804, 827, 834, 839, 840

[56] References Cited
UNITED STATES PATENTS

| | | | |
|---|---|---|---|
| 3,205,715 | 9/1965 | Meek | 73/515 X |
| 3,279,488 | 10/1966 | Jones | 137/840 |
| 3,310,985 | 3/1967 | Belsterling et al. | 73/515 |
| 3,403,563 | 10/1968 | Bowles | 73/515 X |

FOREIGN PATENTS OR APPLICATIONS 116,375   6/1918   United Kingdom.................. 73/515

*Primary Examiner*—James J. Gill
*Attorney, Agent, or Firm*—Nathan Edelberg; Robert P. Gibson; Saul Elbaum

[57] ABSTRACT

A laminar jet linear accelerometer includes a plenum chamber to which pressurized fluid is supplied and a nozzle operatively associated with the chamber for issuing the fluid in the form of a jet. The jet is conducted into another chamber, which is vented to an ambient environment, and output channels, having fluidic output sensors disposed therein, are disposed downstream of the vented chamber. Under non-acceleration conditions, the issued jet uniformly impinges upon the sensors and a zero differential output is sensed and indicated, thereby indicating the absence of an applied acceleration. Under applied acceleration conditions, however, the jet flow is deflected by means of the applied acceleration and consequently, such flow impinges upon the sensors in a non-uniform manner. A differential output is thus sensed and the value or magnitude of the acceleration applied may be determined therefrom.

4 Claims, 1 Drawing Figure

——————— JET (NO ACCELERATION)
— — — — — JET (WITH ACCELERATION)

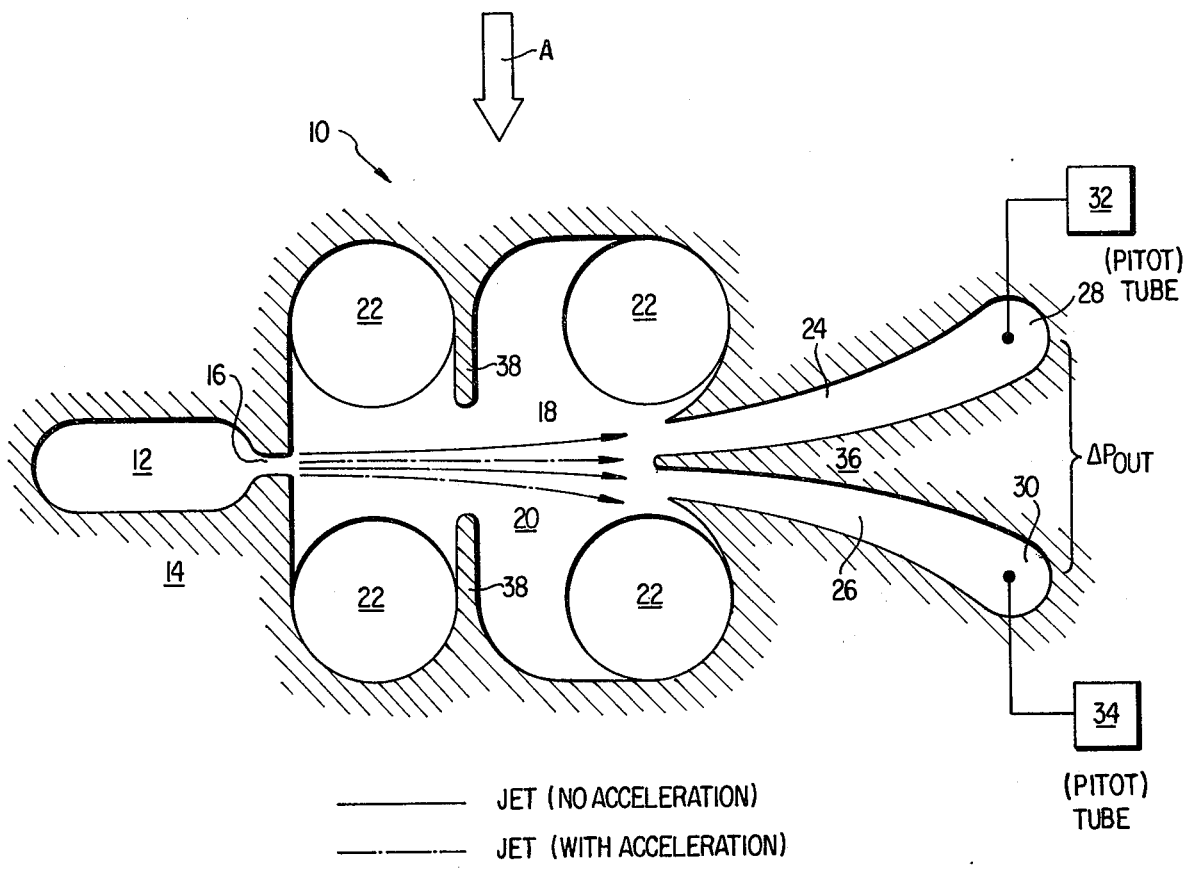

LAMINAR JET LINEAR ACCELEROMETER

RIGHTS OF THE GOVERNMENT

The invention described herein may be manufactured, used, and licensed by or for the United States Government for governmental purposes without the payment to me of any royalty thereon.

BACKGROUND OF THE INVENTION

1. Field of the Invention

The present invention relates generally to accelerometers, and more particularly to a laminar jet linear accelerometer which measures an applied linear acceleration by sensing or detecting a differential output pressure or fluid flow as a result of the deflection of the laminar jet in response to or under the influence of the applied linear acceleration.

2. Description of the Prior Art

While innumerable types of accelerometers are of course widely known and in commercial use, such instruments normally comprise a substantial number of movable components and consequently, it is widely appreciated that conventional accelerometers are extremely delicate instruments. Quite obviously, therefore, extreme care must be accorded such instruments both during implementation of, for example, measuring and testing facilities erected in association with operational systems, as well as during normal operation of such systems, otherwise, the instrument components may become unbalanced and the interrelationship therebetween altered, whereby true readings, characteristic of the acceleration sought to be measured and indicated, will not in fact be obtained.

SUMMARY OF THE INVENTION

Accordingly, it is an object of the present invention to provide a new and improved accelerometer.

Another object of the present invention is to provide an improved accelerometer which overcomes the aforenoted drawbacks of conventional accelerometers.

Still another object of the present invention is to provide an improved accelerometer which does not have any moving parts.

Yet another object of the present invention is to provide an improved accelerometer which is capable of measuring an applied acceleration of potentially very high magnitude.

Yet still another object of the present invention is to provide an improved accelerometer which is capable of measuring an applied linear acceleration with a high degree of resolution.

A further object of the present invention is to provide an improved accelerometer which is capable of fluidically measuring an applied linear acceleration.

A still further object of the present invention is to provide an improved accelerometer which is extremely simple in structure.

The foregoing and other objectives are achieved according to this invention through the provision of an accelerometer which includes a plenum chamber for supplying a pressurized fluid to the system and sensing devices disposed downstream of the plenum chamber for sensing a differential fluidic output of the fluid. The plenum chamber has a nozzle operatively associated therewith for issuing the fluid as a jet from the plenum chamber and into a main chamber, which is vented to an ambient environment and which is interposed between the plenum chamber and the detecting or sensing devices. Under non-acceleration conditions, the gas jet flow uniformly impinges upon the sensing devices and consequently the differential output, and therefore, the applied acceleration, is zero, however, under applied acceleration conditions, the gas jet flow is deflected by means of the applied acceleration and consequently, such flow impinges upon the sensing or detecting devices in a non-uniform manner. As a result, a differential output is sensed and the acceleration may be determined from the value of the sensed differential output.

BRIEF DESCRIPTION OF THE DRAWING

Various other objects, features, and attendant advantages of the present invention will be more fully appreciated as the same becomes better understood from the following detailed description when considered in connection with the accompanying drawing, wherein:

The sole FIGURE is a schematic view of a laminar jet linear accelerometer constructed in accordance with the present invention and showing its cooperative parts.

DETAILED DESCRIPTION OF A PREFERRED EMBODIMENT

The present invention is concerned with a laminar jet linear accelerometer which can measure an applied linear acceleration, of potentially very high magnitude, with a high degree of resolution, and in fact accomplishes such entirely fluidically and without reliance upon any moving parts. The operating principle of the device is based upon the fact that when a jet of gas emanates from a nozzle associated with a plenum chamber from which the fluid or gas is supplied, the static pressure of the gas jet will be slightly greater than the ambient pressure due to the supply pressure within the plenum chamber, and the fact that this greater pressure will subsequently become ambient a short distance downstream of the jet nozzle is immaterial as will become apparent hereinafter.

It is to be appreciated further, that due to the compressibility of a gas, the density of the gas jet will also be slightly greater than the surrounding or ambient medium, and consequently, a density differential exists therebetween upon which an applied acceleration may act in a manner which is quite similar to the phenomenon which may be observed when, for example, a jet of water issues horizontally from a hose and the same is deflected downwardly toward the ground under the influence of gravitational acceleration.

Consequently, by disposing pressure or flow sensors at positions slightly downstream of the plenum chamber jet nozzle, a differential output pressure or flow signal may be generated, and as such a signal is proportional to the jet deflection, which in turn is proportional to the applied acceleration acting upon the issuing gas jet, the applied acceleration may be readily determined. Use of a low power laminar jet, whose dynamic range is in excess of 1,000, results in the same dynamic range for the sensors if they are designed such that the jet is fully deflected at maximum acceleration, the dynamic range being defined as the ratio of the largest output signal detected/the smallest output signal detected, and wherein the smallest output signal detected is conventionally given the value of 1.

From the following well-known relationships, $$\Delta F_j = m \, A \tag{1}$$

$$\Delta F_j = h \, dx \, \Delta P_j \tag{2}$$

$$\Delta F_j = \Delta \rho_j (h \, dx \, b_s) A \tag{3}$$

wherein
$m$ is the relative mass of the gas jet, relative to ambient;
$A$ is the applied acceleration;
$h$ is the depth of the gas jet;
$dx$ is a unit distance in the downstream direction; and
$b_s$ is the width of the gas jet,
the pressure difference $\Delta P_j$, produced as a result of the gas jet deflection when the gas jet was subjected to an applied acceleration A, may then be expressed, from equations (2) and (3) above, as $$\Delta P_j = \Delta \rho_j A \, b_s \tag{4}$$

The density difference for a perfect gas at the constant temperature can of course be expressed from the well-known equation $$\rho = P/RT \tag{5}$$

as:

$$\frac{\rho_j}{\rho_\infty} = \frac{P_j + P_o}{P_\infty + P_o} \tag{6}$$

wherein:
$P_j$ is the gas jet static gage pressure;
$P_o$ is the absolute pressure at STP; and
$P_\infty$ is the ambient static gage pressure,
and if $P_\infty = 0$, which is normal, then from equation (6), we obtain:

$$\frac{\rho_j}{\rho_\infty} = \frac{P_j}{P_o} + 1 \tag{7}$$

Continuing still further, $P_j$ is normally of the order of approximately 1–2% of the supply pressure $P_s$, and for a low aspect ratio device, wherein the aspect ratio is defined as the ratio of the height of the supply nozzle/-width of the supply nozzle, the supply pressure $P_s$ may be of the order of $P_o$, and therefore, under such conditions, $$\frac{\rho_j}{\rho_\infty} = 1.02 \tag{8}$$

or $$\rho_j = 0.02 \, \rho_\infty \tag{9}$$

and the pressure difference across the jet is then simply determined as $$\Delta P_j = 0.02 \, \rho_\infty \, A \, b_s \tag{10}$$

In addition, if the gain $G_P$ of the system, which is defined as the ratio of the output pressure sensed/ applied or input pressure signal, is for example 10, then the output pressure will be 10 times $\Delta P_j$, and in general, the output pressure is linearly related to the acceleration by means of the following equation:

$$\Delta P_{out} = G_p \Delta P_j = (G_p) \, \Delta \rho_j \, b_s \, A \tag{11}$$

Referring now to the sole FIGURE, there is schematically shown a laminar jet linear accelerometer, generally indicated by the reference character 10, which includes a plenum chamber 12 defined within a housing 14 and having operatively associated therewith a nozzle 16 defined therein. Pressurized fluid is supplied to the chamber 12 and the same issues from nozzle 16 in the form of a laminar jet 18, it being apparent that under non-acceleration conditions, the jet 18 is substantially co-axial with chamber 12 and nozzle 16, as schematically shown by the solid-line jet envelope.

The jet 18 issues from nozzle 16 and into another chamber 20 also defined within housing 14, and a plurality of vent ports 22, such as for example, four, being fluidically connected to an ambient environment so as to prevent any pressure build-up within chamber 20, are defined within and uniformly distributed throughout chamber 20. A pair of output channels 24 and 26, having output ports 28 and 30 respectively defined within the downstream end portions thereof, are similarly defined within housing 14 and are fluidically connected to chamber 20 at its downstream end.

Suitable sensing devices 32 and 34 are respectively fluidically connected to output ports 28 and 30 for sensing the output pressures or flow rates therewithin, and it is apparent that channels 24 and 26 are symmetrically disposed upon opposite sides of the non-acceleration gas jet flow axis so as to recieve, and thereby permit devices 32 and 34 to sense and indicate, equal pressure or flow rate values under such non-acceleration conditions. In this manner, the differential pressure or flow rate is zero which means that the system is not being subjected to an applied acceleration. A flow splitter 36, having a sharply tapered upstream portion extending into chamber 20, is integrally formed with housing 14 and is co-axially disposed with respect to chamber 20 and channels 24 and 26 so as to facilitate the smooth flow of the fluid from chamber 20 into the channels 24 and 26 and toward the sensing devices 32 and 34 disposed therewithin. A pair of oppositely disposed swirl attenuation vanes 38 are also integrally formed with housing 14 and are disposed upon opposite sides of the gas jet flow axis, midway between the upstream and downstream ends of chamber 20, so as to prevent any recirculation and backflow of the gas jet toward nozzle 16, and in this manner, spurious pressure or flow signals will not be generated.

In operation of the laminar gas jet linear accelerometer of the present invention, as noted heretofore, in the absence of an applied acceleration, the output pressures or flow rates sensed by devices 32 and 34 will be equal due to the fact that the gas jet flow, as denoted by the solid line envelope within the FIGURE, is symmetrically oriented with respect to flow splitter 36 and output channels 24 and 26 whereby the latter do in fact receive gas flows of equal pressure or flow values and the fluidic outputs uniformly impinge upon devices 32 and 34.

Under acceleration conditions however, in accordance with the operating principles set forth hereinbefore, the acceleration force A, applied to the device in the direction of the arrow as seen in the FIGURE, that is, substantially perpendicular to the fluid flow axis, deflects the gas jet flow in the noted direction, and consequently, the gas flow is now confined within the dotted-line envelope schematically shown within the FIGURE. As a result, the fluidic outputs impinge upon devices 32 and 34 in a non-uniform manner, and a pressure or flow rate differential will be sensed or detected by means of the devices 32 and 34 and consequently, the applied acceleration may be determined. It is to be appreciated that devices 32 and 34 can be of any suitable conventional type, such as for example, pitot type sensors, flow meters, piezoelectric sensors, or the like.

EXAMPLE

For a device where $P_s = 50$ kPa, $\Delta\rho_j \cong 0.01 \rho_\infty$, $b_s = 1.00$ mm, $G_p = 20$, and the maximum output pressure is 25% of $P_s$, the acceleration which is able to drive the device of the present invention to saturation, which is the amount of deflection of the gas jet flow beyond which the maximum pressure differential is not able to be sensed or detected, or in other words, the maximum acceleration value or magnitude capable of being resolved by means of the present inventive device, is $A = 5 \times 10^7$ m/s² ($5 \times 10^6$ g), which value may be simply calculated by utilizing Equation (11). Similarly, the minimum acceleration sensed for a dynamic range of 5,000 is $10^3$ g and thus, an acceleration of 100,000 g can be sensed with a dynamic range of 100.

While the gas jet utilized within the previously disclosed system was the same as the fluid within the ambient environment and was exemplarily considered to be air, a supply jet of a fluid different from the ambient conditions could also be utilized, and this could be either liquid or gaseous. Such may in fact be utilized in order to increase $\Delta\rho_j$ and hence provide an accelerometer for sensing or determining lower levels of acceleration. Utilizing a liquid could in fact result in a very effective low acceleration sensor since $\Delta\rho_j$ would then be of the order of $10^3$ or for the device described hereinabove, a maximum acceleration of $10^3$ m/s² and a threshold, that is, the lowest acceleration value which is able to be sensed, of less than 1 m/s² or 0.1 g, wherein g is the acceleration of gravity.

These concepts can be analytically designed from the theory developed for laminar jet deflection devices, and the dynamic response of a typical device is in the neighborhood of approximately 500 Hz.

Thus it may be seen that the present invention has important advantages over known prior part devices in that a laminar gas jet flow undergoes deflection as a result of being subjected to an applied linear acceleration which results in a sensed or detected differential fluidic output which is a linear function of the applied acceleration. Consequently, the accelerometer of the present invention does not involve any moving parts and is therefore considerably more reliable in operation and less expensive to manufacture.

I wish it to be understood that I do not desire to be limited to the exact details of construction shown and described, for obvious modifications can be made by a person skilled in the art.

What is claimed as new and desired to be secured by Letters Patent of the United States is:

1. An improved laminar jet linear accelerometer, comprising:
    a housing;
    a first chamber defined within said housing and into which a pressurized fluid is supplied;
    a second chamber fluidically connected to said first chamber, said second chamber vented to an ambient environment through a plurality of vents to prevent pressure build-up within said second chamber;
    means defining a nozzle operatively associated with said first chamber for issuing said fluid from said first chamber and into said second chamber in the form of a laminar jet and along a predetermined axis;
    sensing means, fluidically connected downstream from said second chamber and disposed symmetrically about said predetermined axis within fluid channels, for sensing and indicating a differential fluidic output characteristic of said fluid;
    whereby under non-acceleration conditions, said differential output will be zero as said fluid flows along said axis and uniformly impinges upon said sensing means, while under applied acceleration conditions, said differential output will not be zero as said fluid flow will be deflected away from said axis by said applied acceleration so as to non-uniformly impinge upon said sensing means;
    flow splitter means integrally formed with said housing for facilitating the flow of said fluid into said channels toward said sensing means, said flow splitter means disposed co-axially with said flow axis and includes a sharply tapered upstream portion extending into said second chamber; and
    swirl attenuation vanes, disposed within said second chamber, for preventing recirculation and backflow of said fluid toward said nozzle.

2. The accelerometer as set forth in claim 1, wherein: said sensing means are of the pitot type.

3. The accelerometer as set forth in claim 1, wherein; said sensing means are flow meters.

4. The accelerometer as set forth in claim 1, wherein: said swirl attenuation vanes are disposed upon opposite sides of said flow axis and midway between the upstream and downstream ends of said second chamber and on both sides of said swirl attenuation vanes.

* * * * *